G. A. PARKS.
RESURFACING DEVICE.
APPLICATION FILED OCT. 14, 1911.
1,038,947.
Patented Sept. 17, 1912.
2 SHEETS—SHEET 1.
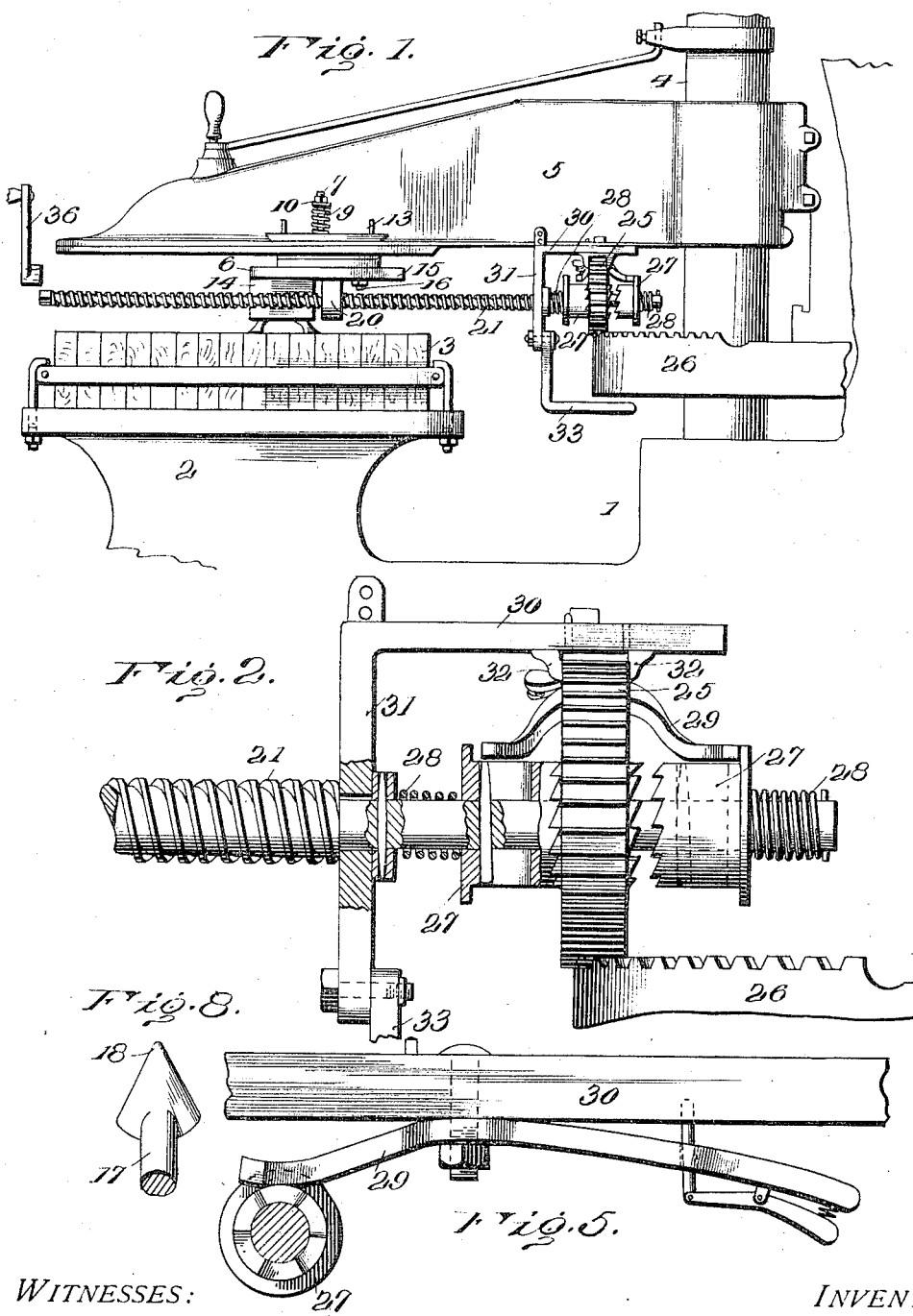
WITNESSES:
W. A. Williams
Francis S. Maguire
James H. Shelly
INVENTOR
G. A. Parks
BY
Attorney G. A. PARKS.
RESURFACING DEVICE.
APPLICATION FILED OCT. 14, 1911.
1,038,947.
Patented Sept. 17, 1912.
2 SHEETS—SHEET 2.
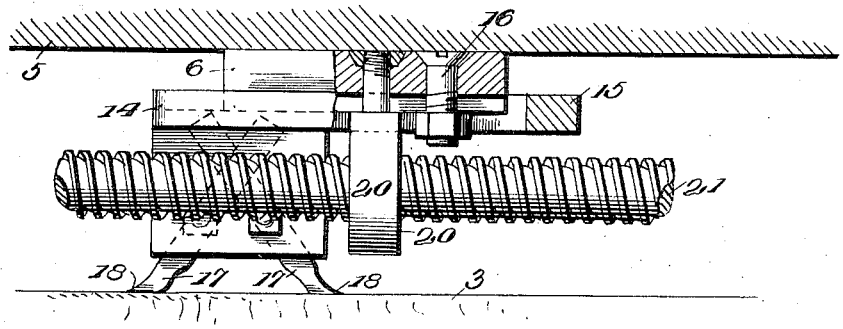
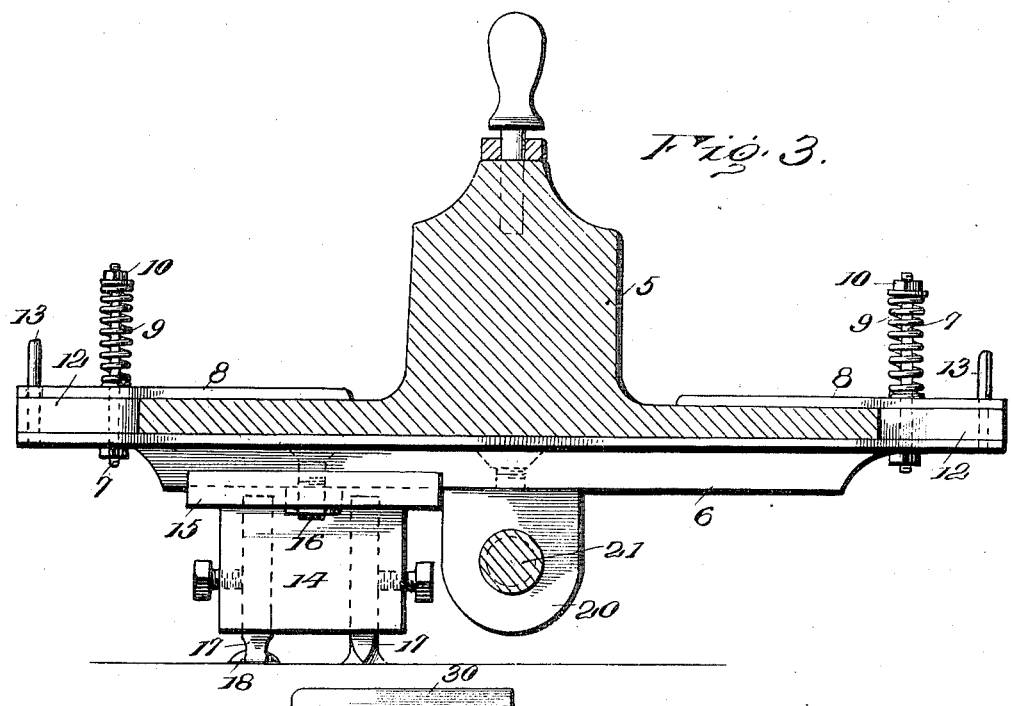
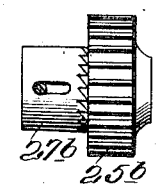
WITNESSES:
W. A. Williams.
Francis S. Maguire
James H. Shelly
INVENTOR
G. A. Parks.
BY
Attorney

UNITED STATES PATENT OFFICE.

GEORGE A. PARKS, OF UPLAND, CALIFORNIA, ASSIGNOR OF ONE-HALF TO JAMES M. BRENNAN, OF UPLAND, CALIFORNIA.

RESURFACING DEVICE.

1,038,947.     Specification of Letters Patent.   Patented Sept. 17, 1912.

Application filed October 14, 1911. Serial No. 654,657.

*To all whom it may concern:*

Be it known that I, GEORGE A. PARKS, of Upland, in the county of San Bernardino and State of California, have invented certain new and useful Improvements in Resurfacing Devices; and I do hereby declare the following to be a full, clear, and exact description of the invention, such as will enable others skilled in the art to which it appertains to make and use the same.

In the art of shoe making as now commonly practised the various parts of the shoe are cut from sheets of fabric by machines embodying, in general, a table supporting a cutting block composed of sections of wood on which the fabric is placed with the cutting die thereover. A vertically movable presser arm located above the block is tripped to force the die through the fabric. It is essential that the top of the cutting block and the bottom of the presser arm shall at all times be parallel, but in the constant use of the machine the surface of the block is roughened and made uneven, and it is necessary frequently to resurface this block in order to secure desirable results. This has heretofore been imperfectly done by means of a saw or rasp, requiring much time in accomplishment and not insuring accurate results. The portions of the cutting blocks on which the dies operate become packed, that is to say, the fibers of the wood are driven together forming an ideal cutting surface, and were it not that certain portions of the block surface are unused the block would seldom need cutting. Resurfacing with a rasp, saw, or like device, pulls out the loose fibers, making the block soft unless it is cut down very deep, in which case it will again pack, with the result that the block is used up very rapidly.

The primary object of my invention is to provide a simple and highly efficient device which may be readily attached to a machine of the class described for resurfacing the cutting block and which may be easily removed after use; and one which will quickly and accurately plane the surface of the block to insure its parallelism with the bottom of the presser arm. And a further object is to provide for cutting across the grain of the wood so as to secure a cut of the desired depth without disturbing the packed surface, that is to say, without pulling out the fibers.

The invention will be hereinafter fully set forth and particularly pointed out in the claims.

In the accompanying drawings, Figure 1 is a view in side elevation of a portion of a machine equipped with my improvement. Fig. 2 is an enlarged view of the means for rotating the carrier moving rod. Fig. 3 is a front end view with the presser arm in section, showing the carrier in position. Fig. 4 is a side elevation, on an enlarged scale, of the carrier, tool holder, and a portion of the carrier operating rod. Fig. 5 shows the clutch shifting means. Figs. 6 and 7 show modified forms of clutches. Fig. 8 is a plan view of a cutting knife.

Referring to the drawings, 1 designates a portion of a frame of a machine of standard type for cutting with dies sheet material for boots and shoes, such as the upper leather. It embodies a table 2 supporting a wooden cutting block 3, which latter is usually composed of several sections. A vertically disposed shaft 4 forms the support for a vertically reciprocal and horizontally oscillating presser arm 5. The means for raising and lowering the presser arm forms no part of my present invention, and may be of any known construction.

6 designates a tool carrier which is designed to be mounted on the lower face of the presser arm and to be moved longitudinally thereof, either inwardly or outwardly as the arm is oscillated. The particular formation of the carrier may be widely varied, but preferably it comprises a block fitted against the under surface of the arm and held thereto by bolts 7 and plates 8 which extend inwardly over the flanges of the arm, said bolts 7 having springs 9 thereon which are placed under tension by nuts 10. Between the carrier block and the clamping plates 8, adjacent to the longitudinal edges of the arm, are thrust plates 12 which are formed with openings to accommodate the bolts 7, and also guiding pins 13 carried by the block, and projecting, also, through openings in plates 8. In a groove in the lower under face of the carrier block is fitted a tool holder 14 which has a rearward extension 15, as shown in Fig. 4, and through a slot in this extension is passed a clamping bolt 16 whose head is countersunk in the carrier. This enables the tool holder to be set in different positions so that the tools may cut close to the edges of the block.

In Fig. 4 I have shown two knives 17 extended diagonally in opposite directions. Each knife has a shank which is engaged by a set screw or other suitable means, and its cutting portion 18 is of V-shape or triangular formation, as shown in Fig. 8, so that the knife when moved laterally in either direction will cut across the grain of the wood and to the desired depth without pulling out the fibers, thus leaving the packed surface in perfect condition for use. The carrier also has a swiveled block 20 depending therefrom, and this block has a threaded opening which accommodates a screw rod 21 which parallels the lower face of the presser arm. The turning of the screw rod will effect the travel of the carrier on the presser arm either inwardly or outwardly.

The means for rotating the carrier actuating rod may be widely varied, but preferably I contemplate the automatic rotation of the rod as the presser arm is swung laterally, and the direction of rotation of the rod may be changed at pleasure according as it is desired that the carrier shall travel either inwardly or outwardly. The means shown in the present instance, and which I find best adapted for the purpose, comprises a gear wheel 25 loose on the inner end of rod 21 and which may be clutched or otherwise locked to the rod to effect its rotation, the gear itself being rotated by a segmental rack 26 arranged concentrically on shaft 4. According to the preferred means, as shown in Fig. 2, this gear wheel 25 has on its sides reversely faced ratchet teeth which are designed to engage the ratchet faces of spring pressed clutch sleeves 27, which latter are slidable on screw rod 21. Each sleeve 27 is under the control of its respective spring 28, and either sleeve may be held out of engagement with the gear wheel by a shifting lever 29 fulcrumed on the underside of an extension 30 of a clamping frame 31 which is held by suitable means to the presser arm. This frame has parallel lugs 32 which hold wheel 25 from moving longitudinally of the screw rod. The shifting lever 29 may be locked in either of its two positions, depending on the direction it is desired to rotate the screw rod. A right angular arm 33, depending from clamping frame 31 holds the segmental rack in proper position relative to the gear wheel 25. It will be understood that as the presser arm is shifted laterally the engagement of the gear wheel with the rack effects the rotation of the screw rod, and this, in turn, causes the tool carrier to travel longitudinally of the presser arm, but this travel will occur only when the presser arm is moved in one direction unless lever 29 is actuated to shift the clutches. It is manifest that various means may be employed for changing the direction of rotation of the carrier actuating rod. For instance, in Fig. 6 I have shown gear wheel 25$^a$ as having ratchet teeth on only one side for engaging a single clutch sleeve 27$^a$, a nut 34 serving to hold the gear on the shaft. For reversing the rotation of the screw rod a gear wheel and sleeve having reversely faced ratchet teeth, as shown at 25$^b$ and 27$^b$, Fig. 7, may be substituted.

To enable the tool carrier to be adjusted along the arm to the position at which it is desired to effect a cut, I form the segmental rack 26 with cut outs 35 at the ends of the rack teeth so that when the gear is caused to enter either of these cut outs the operator by applying a crank 36 to the outer end of the screw rod may turn the latter and thus adjust the carrier.

In practice, the carrier is first adjusted along the presser arm according to the point it is desired to begin the resurfacing operation, and when the arm is swung on its vertical axis the gear wheel is rotated by the rack and thereby effects the rotation of the screw rod, which, in turn, causes the travel of the tool carrier on the presser arm, either inwardly or outwardly. If the clutch is not changed the carrier will move relatively to the presser arm only when the latter is swung in one direction, its reverse movement having no effect on the carrier. Hence the carrier may gradually, step by step, be moved outwardly or inwardly, as the case may be, by the constant lateral movement of the presser arm, and when it has reached the limit of its travel the direction of rotation of the screw rod may be changed. Thereupon the carrier will travel in the opposite direction as the presser arm is swung on its axis, and in this way the entire block may be readily resurfaced to a uniform depth.

By means of the double edged knife the block may be cut to the desired depth without disturbing the packed surface. The operation of the machine is both quick and accurate, with the result that the surface of the block is left truly parallel with the table and with the lower face of the presser arm.

It will be understood that changes may be made without departing from the spirit of my invention. For instance, if desired, instead of using the double edged knife of V-shape or triangular formation, any other cutting tool or rasp may be substituted.

I claim as my invention:

1. A machine of the class described, comprising, in combination with a block, and a presser member arranged to swing about a vertical axis at one side of the block, means for resurfacing said block horizontally slidable on said presser member, and means for effecting a continuous relative movement between said resurfacing means and said presser member as the latter is moved laterally in one direction.

2. A machine of the class described, comprising, in combination with a block, and a presser member arranged to swing about a vertical axis at one side of the block, means for resurfacing said block carried by said presser member, and means for effecting a continuous relative movement between said resurfacing means and said presser member as the latter is moved laterally in either direction.

3. A machine of the class described, comprising, in combination with a block, and a presser member arranged to swing about a vertical axis at one side of the block, means for resurfacing said block carried by said presser member, means for effecting a continuous relative movement between said resurfacing means and said presser member as the latter is moved laterally in one direction, and means for changing the direction of such relative movement between said resurfacing means and the presser member.

4. A machine of the class described, comprising, in combination with a block, and a presser member arranged to swing about a vertical axis, at one side of said block, means for resurfacing said block comprising a carrier slidably mounted on said presser member, said carrier having a threaded portion, a screw rod engaging said threaded portion of the carrier, a gear wheel on said screw rod, and a rack concentric with said vertical axis of the presser arm and with which said gear wheel engages.

5. A machine of the class described, comprising, in combination with a block, and a presser member arranged to swing about a vertical axis at one side of said block, means for resurfacing said block comprising a carrier slidably mounted on said presser arm, said carrier having a threaded portion, a screw rod engaging said threaded portion of the carrier, a gear wheel loose on said screw rod, a clutch for locking said gear-wheel to said screw rod, and a rack concentric with said vertical axis of the presser arm and with which said gear wheel engages.

6. A machine of the class described, comprising, in combination with a block, and a presser member arranged to swing about a vertical axis at one side of said block, means for resurfacing said block comprising a carrier slidably mounted on said presser arm, said carrier having a threaded portion, a gear wheel loose on said screw rod, a clutch for locking said gear wheel to said screw rod to effect the turning thereof in either direction, and a rack concentric with said vertical axis of the presser arm and with which said gear wheels engage.

7. A machine of the class described, comprising, in combination with a block, and a presser member arranged to swing about a vertical axis at one side of said block, a segmental rack partly surrounding and concentric with said vertical axis, said rack having a cut out at the end thereof, a resurfacing tool, a carrier therefor slidably mounted on said presser member, said carrier having a threaded block, a screw rod engaging said threaded block, a gear wheel carried by said screw rod engaging said rack for effecting the travel of the carrier on the presser arm as the latter is swung on its axis, and means for actuating the screw rod to adjust the carrier when said gear wheel is in said cut out.

8. The combination with a block and a presser arm movable horizontally thereover, of a resurfacing tool, a carrier therefor horizontally slidable on the presser arm, said carrier comprising a block beneath the presser arm, upper plates mounted on the presser arm, and means carried by the block for holding said plates to said arm, said means being located beyond the edges of the presser arm.

9. The combination with a block and a presser arm movable horizontally thereover, of a resurfacing tool, a carrier therefor horizontally slidable on the presser arm, said carrier comprising a block beneath the presser arm, upper plates mounted on the presser arm, means carried by the block for holding said plates to said arm, said means being located beyond the edges of the presser arm, and means for automatically moving the carrier horizontally on the presser arm.

In testimony whereof, I have signed this specification in the presence of two subscribing witnesses.

GEORGE A. PARKS.

Witnesses:
A. E. HUNTINGTON,
C. MOON.